United States Patent
Martin

(10) Patent No.: US 7,137,304 B2
(45) Date of Patent: Nov. 21, 2006

(54) PRESSURE SENSOR

(75) Inventor: Rainer Martin, Efringen-Kirchen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 147 days.

(21) Appl. No.: 10/496,834

(22) PCT Filed: Nov. 15, 2002

(86) PCT No.: PCT/EP02/12801

§ 371 (c)(1),
(2), (4) Date: Dec. 15, 2004

(87) PCT Pub. No.: WO03/046499

PCT Pub. Date: Jun. 5, 2003

(65) Prior Publication Data

US 2006/0207333 A1 Sep. 21, 2006

(30) Foreign Application Priority Data

Nov. 27, 2001 (DE) ................. 101 57 761

(51) Int. Cl.
G01L 7/08 (2006.01)
(52) U.S. Cl. ....................... 73/756
(58) Field of Classification Search .......... 73/706, 73/726, 756
See application file for complete search history.

(56) References Cited

U.S. PATENT DOCUMENTS

| | | | | |
|---|---|---|---|---|
| 4,665,753 A | * | 5/1987 | Bertrand | 73/706 |
| 4,735,091 A | * | 4/1988 | Engeler et al. | 73/756 |
| 4,965,777 A | * | 10/1990 | Timossi et al. | 367/140 |
| 5,492,017 A | * | 2/1996 | Jennings et al. | 73/728 |

FOREIGN PATENT DOCUMENTS

| | | |
|---|---|---|
| DE | 41 39 147 A1 | 6/1992 |
| DE | 197 44 208 C1 | 12/1998 |
| DE | 200 13 295 U1 | 4/2001 |
| GB | 21 65 055 A | 4/1986 |

* cited by examiner

Primary Examiner—Edward Lefkowitz
Assistant Examiner—Andre Allen
(74) Attorney, Agent, or Firm—Bacon & Thomas

(57) ABSTRACT

The pressure sensor of the invention, with an internal hydraulic system for pressure transfer, has a seal enabling an exact fill volume for the hydraulic system. The pressure sensor includes: a platform; at least one separating membrane, which, with the platform, encloses a pressure chamber; a hydraulic path inside the platform, which communicates with the pressure chamber; a platform blind hole in a surface of the platform, with, extending from the end of the platform blind hole, a canal, which communicates with the hydraulic path, wherein the diameter of the canal is smaller than the diameter of the platform blind hole, so that a first abutment surface is formed between the platform blind hole and the canal; a sealing element insertable into the platform blind hole and having a second abutment surface complementary to the first abutment surface and having a radially flexible, lateral surface; and an expander, which can be brought into engagement with the sealing element, in order to expand the lateral surface of the sealing element radially.

9 Claims, 2 Drawing Sheets

PRESSURE SENSOR

FIELD OF THE INVENTION

The present invention relates to pressure sensors, especially pressure sensors containing liquid.

BACKGROUND OF THE INVENTION

A pressure sensor, especially a differential pressure sensor, includes a platform, at each end of which is attached an advantageously circularly-shaped membrane, or diaphragm, with formation of a pressure chamber between the platform end surface and the membrane. The two pressure chambers are coupled together over a hydraulic path, with the pressure chambers, the hydraulic path, and possible other sections communicating with them being filled with a hydraulic liquid. For operating the pressure sensor, it is necessary to place a liquid quantity defined as exactly as possible in the hydraulic system composed of the two pressure chambers, the hydraulic path, and the possibly present, communicating sections. For this purpose, for example, the hydraulic system is completely filled with a hydraulic liquid, and a steel sphere of diameter greater than the inner diameter of the filling nozzle is pressed into the filling nozzle, where it remains lodged under plastic deformation of the wall. In this way, the hydraulic system is sealed, but there is variation with respect to sphere position and the trapped amount of liquid. Moreover, this sealing of the pressure sensor is little suited in the case of platforms made of ceramic.

In another solution of the prior art, the filling nozzle of the hydraulic system has an outer section with a first radius, which is greater than the radius of a sealing sphere, and a second section with a smaller radius than the radius of the sealing sphere, so that, at the transition between the first section and the second section, an abutment surface is formed, which can be sealed by the sphere. The sphere is fixed in this position with a screw, which engages a thread formed in the wall of the first section of the filling nozzle.

This solution is complicated to build, as regards providing the thread. Moreover, it leads to small variations in the trapped volume, since the sphere surface or the abutment surface can be elastically, or plastically, deformed as a function of the bearing pressure of the screw.

SUMMARY OF THE INVENTION

An object of the invention is, therefore, to provide a pressure sensor with an improved sealing system.

This object is achieved, according to the invention, by the pressure sensor of claim 1. Additional aspects of the invention follow from the dependent claims, the description, and the drawings.

The pressure sensor of the invention includes:

a platform;

at least one separating membrane, which, with the platform, encloses a pressure chamber;

a hydraulic path inside the platform, which communicates with the pressure chamber;

a platform blind hole in a surface of the platform, with, extending from the end of the platform blind hole, a canal, which communicates with the hydraulic path, wherein the diameter of the canal is smaller than the diameter of the platform blind hole, so that a first abutment surface is formed between the platform blind hole and the canal;

insertable into the platform blind hole, a sealing element having a second abutment surface complementary to the first abutment surface; and an expander, which can be brought into engagement with the sealing element, in order to expand the lateral surface of the sealing element radially.

The platform blind hole is preferably essentially cylindrical.

The lateral surface of the sealing element preferably has an outer diameter, which is smaller than the inner diameter of the platform blind hole, with the sealing element further preferably having on its rear side away from its sealing surface a blind hole, into which the expander can be inserted. The outer diameter of the expander is greater than the inner diameter of the sealing element blind hole, so that the lateral surface of the sealing element is pressed against the lateral surface of the platform blind hole by insertion of the expander.

The filling of the pressure sensor occurs preferably through the canal, until the liquid level rises above the first abutment surface into the platform blind hole. Then, the sealing element is inserted into the platform blind hole, with the sealing element easily pushing the excess liquid aside, since, with the selected radii, a gap remains between the lateral surface of the sealing element and the wall of the blind hole. After the second abutment surface contacts the first abutment surface, then, for given temperature, an exact, predetermined quantity of liquid is trapped in a likewise exact, predetermined volume. Now, when the expander is inserted into the blind hole of the sealing element, there is no longer any axial displacement of the sealing element, but, instead, only a radial expansion of a part of its lateral surface. This fixes the sealing element securely in the platform blind hole, without changing the trapped volume.

For improving the sealing action, the lateral surface of the sealing element is preferably elastically constructed. To accomplish this, one option is to apply an elastic layer on a stiffer support, while another option is to form the entire sealing element of a suitable elastic material. The precise details of the sealing element are discretionary and depend essentially on the pressure loads to be expected. In the simplest embodiment, the sealing element is essentially held by friction in the platform blind hole. If greater pressure loads are to be expected, however, additional, positively fitting securement means can be provided.

In the simplest embodiment, the platform blind hole has a purely cylindrical shape with a preferably essentially planar, first abutment surface between the platform blind hole and the canal. However, adaptations to accommodate the precise details of given applications are easily possible. For example, the first abutment surface can be in the form of the lateral surface of a truncated cone, or frustum, with the second abutment surface, in such case, then having a complementary form. A frustum- or conical-shape of the second abutment surface facilitates the removal of gaseous inclusions during the insertion of the sealing element into the platform blind hole.

In such case, however, the angle of inclination of the lateral surface of the cone is to be chosen such that the axial force during insertion of the expanding element can not lead to a shifting of the sealing element in the axial direction.

For positive securement of the sealing element, recesses can be provided in the wall of the platform blind hole. Such recesses are preferably annularly shaped. These recesses should preferably form axial abutment surfaces, with which suitable locking means of the sealing element can mechanically interlock on the basis of shape upon insertion of the expander.

BRIEF DESCRIPTION OF THE DRAWINGS

The invention will now be explained in greater detail on the basis of examples of embodiments and the associated drawing figures, which show as follows.

DESCRIPTION OF THE PREFERRED EMBODIMENT

Figure 1:
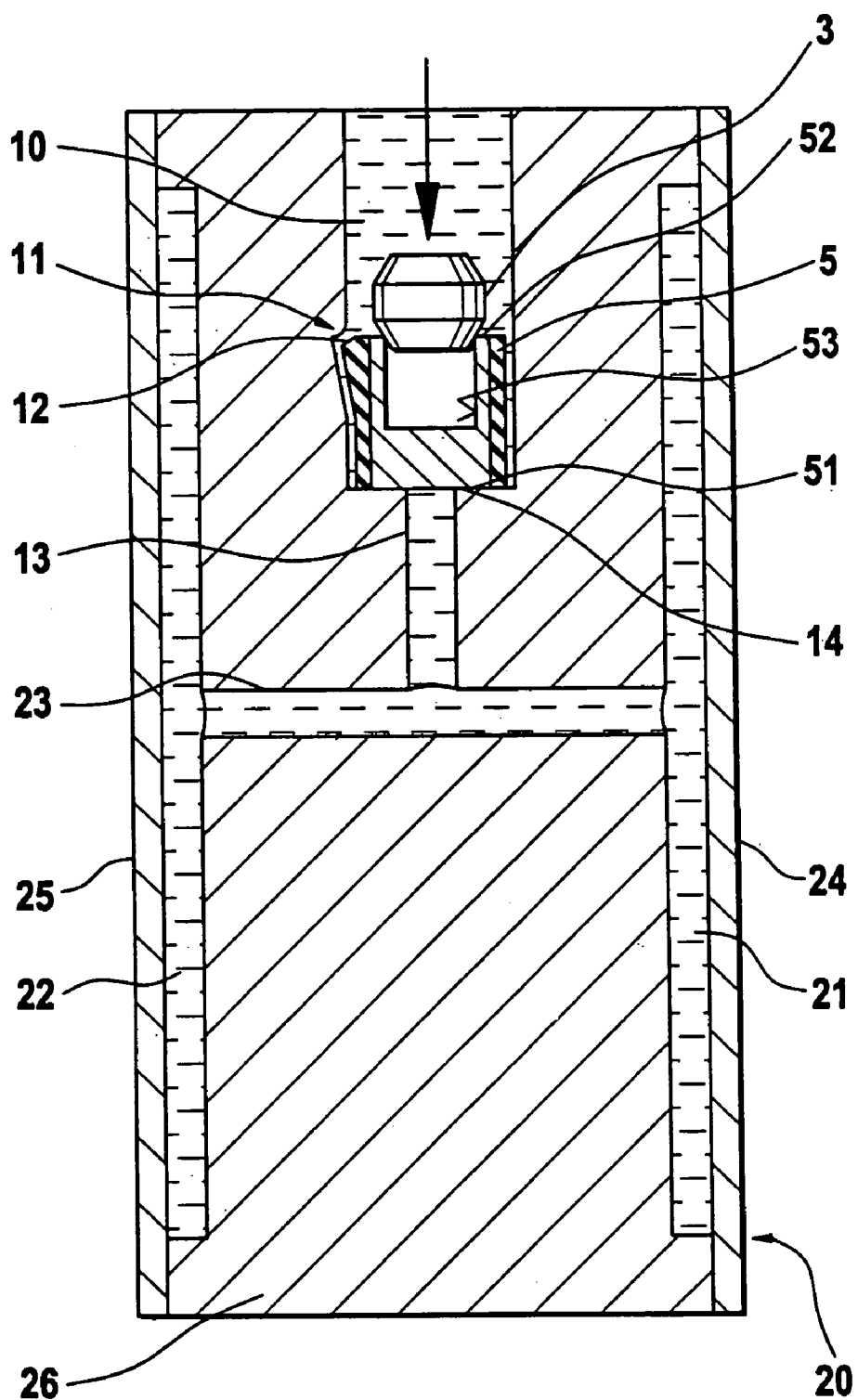
FIG. 1: a cross section through a differential pressure sensor of the invention.

The differential pressure sensor 20 includes a platform 26 of preferably cylindrical shape. Secured on each end surface of platform 26 are membranes 24, 25, to form, respectively, the pressure chambers 21, 22. The two pressure chambers are connected together in this embodiment by a pressure canal 23. The pressure chambers 21, 22 and the pressure canal 23 are filled with a transfer liquid through a canal 13, with the hydraulic system, including the two pressure chambers 21, 22, the pressure canal 23 and the canal 13 then being pressure-tightly sealed.

In the intended use of the differential pressure sensor, the two membranes 24, 25 are loaded, in each case on their surfaces facing away from the platform, with first and second measurement pressures, respectively, with the deflections of the membranes 24, 25 from their rest positions being a function of the difference between the first and second measurement pressures.

The pressure difference can be registered in appropriate manner, for example capacitively or piezoresistively, this being a subject which does not have to be explored here in more detail, since the principles are well known to those skilled in the art.

Especially for a differential pressure sensor, it is important that the quantity of the filling of the hydraulic system correspond as exactly as possible to a predetermined value, in order that the membranes 24, 25 be located in the equilibrium position and at a reference temperature at the predetermined working point.

The charging of a predetermined fill quantity of hydraulic liquid in the hydraulic system is made possible by the described sealing system. The platform exhibits in its lateral surface a bore, or a platform blind hole, 10, as the case may be, into whose end surface the canal 13 opens, with the canal 13 having a smaller diameter than the blind hole 10.

Following the charging of the hydraulic system with hydraulic liquid, a cup-shaped sealing element is inserted into the platform blind hole. The base of this sealing element is complementary to a first abutment surface 14, which is formed between the opening of the canal 13 and the wall of the housing blind hole. The end surface of the sealing element serves as a second abutment surface 51, which sits on the first abutment surface 14. In the case of this embodiment, the sealing element has on its lateral surface an elastic layer, preferably an elastomer. The sealing element 5 is so dimensioned, that first an annular gap remains between the lateral surface of the sealing element 5 and the wall of the platform blind hole 10, so that the hydraulic liquid can flow past the sealing element, when the sealing element is inserted into the platform blind hole 10. Following the seating of the second abutment surface 51 on the first abutment surface 14, liquid exchange between the hydraulic system and the surroundings is terminated. The sealing element 5 exhibits in its rear surface 52 facing away from the canal a blind hole 53, into which an expander 3 is pressed. The lateral surface of the expander 3 exhibits a larger outer radius than the radius of the sealing element blind hole 53. At least in an end section of the expander 3, a frustum section is provided, which, upon the pressing of the expander 3 into the blind hole 53 of the sealing element 5, pushes the lateral surface of the sealing element 5 in its rear section radially outwards, so that a frictional-hold connection is achieved between the wall of the platform blind hole and the lateral surface of the sealing element 5.

In the central section of the expander 3, a section of cylindrical lateral surface is provided. In this section, the expander 3 exhibits the largest radius. When the expander is completely pressed into the blind hole 53, then essentially only radial forces act on it, so that it can no longer be pushed back out of the blind hole. Instead of the just-described embodiment, the expander can, however, also be provided with a spherical shape, which leads to the same behavior. The spherical shape is advantageous in that spheres of any diameter are commercially available at favorable prices.

Preferably, the expander 3 is symmetric about a plane of reflection perpendicular to its axis of symmetry, i.e. a frustum is provided on the rear side of the expander 3 too. This effects that remaining axial forces, which can act on the front frustum, can be balanced by corresponding axial, opposing forces, which act on the frustum on the rear side of the expander.

To the extent required, recesses 11 can be provided in the wall of the platform blind hole 10, with which protrusions on the lateral surface of the sealing element 5 can engage, when the expander is pressed into the sealing element blind hole 53. In this way, the sealing element becomes held not only by friction but also positively by mechanical interlocking on the basis of shape.

The cores of the sealing element 5 and the platform 26 can be manufactured of various materials; for example, the sealing element can have a steel core, while the platform 26 can include a ceramic, e.g. corundum. In this case, an especially preferred embodiment of the sealing element exhibits a lateral surface having an elastic seal suited for absorbing mechanical stresses arising from differing thermal expansions.

Figure 2:
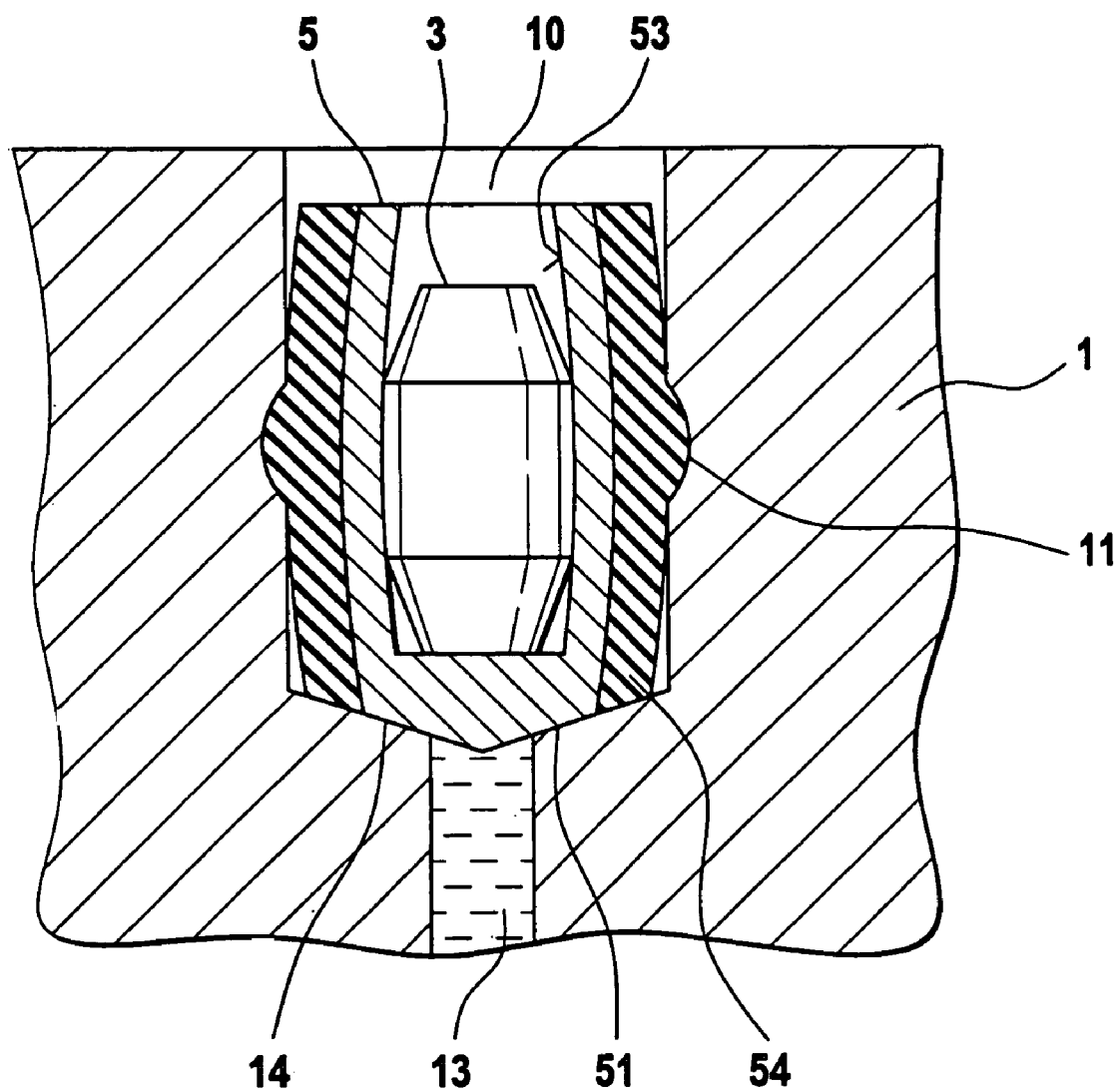
FIG. 2: a modified form of a sealing system for a pressure sensor of the invention.

FIG. 2 shows a slightly modified embodiment of the sealing arrangement, wherein the cylindrical wall of the platform blind hole 10 is provided with an annular groove 11. Additionally, the first end surface is in the form of a frustum, whereby the complete removal of air bubbles in the hydraulic liquid is facilitated, for the second abutment surface 51 on the end of the sealing element 5 is likewise shaped conically, so that air bubbles can escape during insertion of the sealing element on the basis of their buoyancy. For centering the sealing element, radial lobes can be provided in its forward section. The sealing element 5 has a cup-shaped core of an elastic metal, which is coated with a jacket 54 of an elastic sealing material, preferably rubber. The material thickness of the jacket 54 is so dimensioned that the jacket fills the annular groove 11 in the wall of the platform blind hole following the pressing of the expanding element 3 into the blind hole 53 of the sealing element 5.

The expander 3 can, in all embodiments, have a threaded bore along its axis of symmetry, in order to enable removal of the expander from the sealing element by means of a screwed-in bolt, for example for maintenance of the pressure sensor. Instead of a threaded bore, a bore with at least one abutment surface for receiving an axial force can be provided, for example in the form of a bayonet connector.

The invention claimed is:

1. A pressure sensor, comprising:
a platform;
at least one separating membrane, which, with the platform, encloses a pressure chamber, said platform defining a hydraulic path which communicates with said pressure chamber, and defining a canal and a platform blind hole in a surface of said platform, which extends from the end of the platform blind hole, said canal communicating with said hydraulic path, wherein the diameter of said canal is smaller than the diameter of said platform blind hole, so that a first abutment surface is formed between said platform blind hole and said canal;
a sealing element insertable into said platform blind hole, said sealing element having a second abutment surface for supporting said sealing element on said first abutment surface, and additionally having a radially flexible, lateral surface; and
an expander, which can be brought into engagement with said sealing element, in order to expand the lateral surface of said sealing element radially.

2. The pressure sensor as claimed in claim 1, wherein:
said lateral surface of the sealing element is radially elastic and the outer diameter of said lateral surface in the equilibrium position is less than the inner diameter of said platform blind hole.

3. The pressure sensor as claimed in claim 1, wherein:
said sealing element has on its rear side away from said second abutment surface a blind hole, into which said expander can be inserted.

4. The pressure sensor as claimed in claim 3, wherein:
said outer diameter of said expander is greater than the inner diameter of said sealing element blind hole, so that the lateral surface of said sealing element is pressed against the lateral surface of said platform blind hole by insertion of said expander.

5. The pressure sensor as claimed in claim 1, wherein:
said expander has at least one tapering end section.

6. The pressure sensor as claimed in claim 1, wherein:
said platform blind hole has at least one recess on its lateral surface and said sealing element has at least one locking means, which can be brought into engagement with said at least one recess by means of said expander.

7. The pressure sensor as claimed in claim 1, wherein:
said platform comprises a ceramic material.

8. The pressure sensor as claimed in claim 1, wherein:
said second abutment surface has a shape which is complementary to that of said first abutment surface.

9. The pressure sensor as claimed in claim 1, wherein:
said pressure sensor is one of: an absolute pressure sensor, a relative pressure sensor or a differential pressure sensor.

* * * * *